J. W. Harper,
Post Hole Digger,
N°. 62,131.    Patented Feb. 19, 1867.

Witnesses
Thomas T. Parker
R. D. O. Smith

Inventor
James W. Harper,
By his atty.,
J. L. Brown

United States Patent Office.

JAMES W. HARPER, OF XENIA, OHIO.

Letters Patent No. 62,131, dated February 19, 1867.

---

IMPROVEMENT IN INSTRUMENT FOR DIGGING POST HOLES.

---

*The Schedule referred to in these Letters Patent and making part of the same.*

---

TO ALL WHOM IT MAY CONCERN:

Be it known that I, J. W. HARPER, of Xenia, in the county of Green, and State of Ohio, have invented a new and useful Instrument for Digging Post Holes and Tile and Pipe Ditches; and I do hereby declare that the following is a full and exact description thereof, reference being had to the accompanying drawings, making part of this specification—

Figure 1:
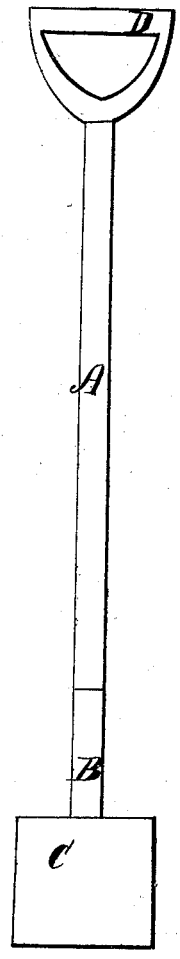

Figure 1 being a side view of the instrument.

Figure 2:
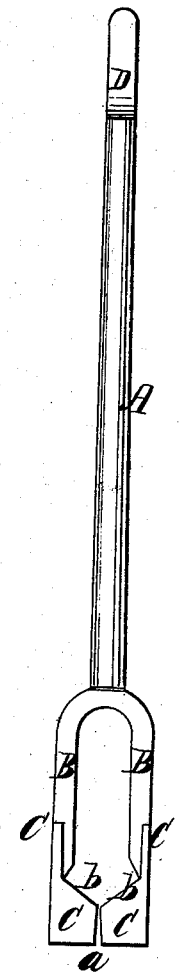

Figure 2, an edge view thereof.

Figure 3:
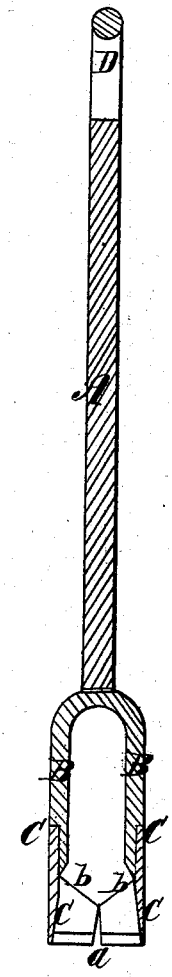

Figure 3, a central longitudinal section from side to side.

Like letters designate corresponding parts in all of the figures.

The instrument is composed of a shaft, A, with a handle, D, at the top; and two blades, C C, connected with the shaft by a bow-shank, B, substantially as represented in the drawings. The shaft A may be of iron or wood. The bow-shank B and blades C C are made of steel, and are somewhat elastic, so that the blades may spring apart slightly when pressure is applied between them. The lower edges of the blades are sharp, being bevelled or ground off on the inside, so that the outside may be vertical and straight. They have wings, $b\ b$, generally of only a part of their height, and bent round into a vertical plane at right angles, or nearly so, to the planes of the blades, so that the edges of the opposite wings nearly meet, all substantially as shown. They are let into shoulders, $c\ c$, in the outside of the lower ends of the bow-shank B, so that the outer surfaces of all shall be flush and even. The ends of the bow-shank project down inside of the blades and are riveted or welded thereto. The width of the blades depends on the size of the holes or ditches to be dug, generally about six or seven inches, and their distance apart is about five or six inches.

The instrument is used by forcing the blades down into the ground and then lifting out the earth which adheres between the blades. This adherence is caused by the compression of their slightly bevelled surfaces, by the springing of the blades together, being slightly separated by the pressure of the earth and partly by friction. After the earth is raised out of the hole or ditch it is readily disengaged from the blades by gently knocking the instrument on the ground or against something.

What I claim as my invention, and desire to secure by Letters Patent, is—

The spring blades C C, of rectangular form or construction, and entirely separated on opposite sides, so that they may be sprung apart or away from each other, substantially as and for the purpose herein specified.

The above specification of my improved machine for digging post holes and tile and pipe ditches signed by me this 22d day of May, A. D. 1866.

J. W. HARPER.

Witnesses:
J. A. SEXTON,
W. K. McKIBBEN.